US011646890B2

(12) United States Patent
Pålsson et al.

(10) Patent No.: US 11,646,890 B2
(45) Date of Patent: May 9, 2023

(54) ENCLAVE POPULATION

(71) Applicant: Telefonaktiebolaget LM Ericsson (publ), Stockholm (SE)

(72) Inventors: Lina Pålsson, Genarp (SE); Bernard Smeets, Dalby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 282 days.

(21) Appl. No.: 17/054,897

(22) PCT Filed: May 16, 2018

(86) PCT No.: PCT/EP2018/062640
§ 371 (c)(1),
(2) Date: Nov. 12, 2020

(87) PCT Pub. No.: WO2019/219181
PCT Pub. Date: Nov. 21, 2019

(65) Prior Publication Data
US 2021/0367787 A1 Nov. 25, 2021

(51) Int. Cl.
*H04L 9/40* (2022.01)
*H04L 9/32* (2006.01)
*H04L 9/08* (2006.01)

(52) U.S. Cl.
CPC .......... *H04L 9/3234* (2013.01); *H04L 9/0825* (2013.01); *H04L 9/0877* (2013.01); *H04L 9/0897* (2013.01); *H04L 2209/127* (2013.01)

(58) Field of Classification Search
CPC ... H04L 9/3234; H04L 9/0825; H04L 9/0877; H04L 9/0897; H04L 2209/127
See application file for complete search history.

(56) References Cited

U.S. PATENT DOCUMENTS 9,491,111 B1 11/2016 Roth et al.
9,577,829 B1 2/2017 Roth et al.
(Continued)

FOREIGN PATENT DOCUMENTS

WO 2015/047442 A1 4/2015
WO 2015/094261 A1 6/2015
(Continued)

OTHER PUBLICATIONS

International Search Report and Written Opinion issued in International Application No. PCT/EP2018/062640 dated Jan. 29, 2019 (20 pages).
(Continued)

*Primary Examiner* — Thaddeus J Plecha
(74) *Attorney, Agent, or Firm* — Christopher & Weisberg, P.A.

(57) ABSTRACT

A method is disclosed of a secure component (SC) of a local attestation server (LAS) for populating an enclave associated with the LAS. The SC comprises stored encrypted population information previously received in a data packet and encrypted by an encryption key matching a private decryption key of a trusted platform module (TPM) associated with the LAS. The method comprises receiving a public part of a temporary asymmetric key from the enclave, establishing a secure session between the SC and the TPM, sending (to the TPM by using the secure session) the encrypted population information and the public part of the temporary asymmetric key, receiving (from the TPM by using the secure session) the population information decrypted by the private decryption key and re-encrypted by the public part of the temporary asymmetric key, and transmitting the re-encrypted population information to the enclave. An additional method is also disclosed for enabling the population of the enclave. The additional method com-
(Continued)

prises receiving control parameters of the LAS, comprising the encryption key matching the private decryption key of the TPM, encrypting population information based on the control parameters and using the encryption key, and sending a data packet comprising the encrypted population information to the SC. Corresponding apparatuses and computer program product are also disclosed.

20 Claims, 2 Drawing Sheets

(56) References Cited

U.S. PATENT DOCUMENTS

| | | | |
|---|---|---|---|
| 9,584,517 | B1 | 2/2017 | Roth et al. |
| 9,754,116 | B1 | 9/2017 | Roth et al. |
| 10,977,384 | B2 * | 4/2021 | Benaloh .............. G06F 21/6245 |
| 2008/0077994 | A1 | 3/2008 | Comlekoglu |
| 2012/0159184 | A1 | 6/2012 | Johnson et al. |
| 2015/0281189 | A1 | 10/2015 | Nayshtut et al. |
| 2016/0350534 | A1 | 12/2016 | Poornachandran et al. |
| 2017/0177846 | A1 * | 6/2017 | Sarangdhar .............. G06F 21/62 |
| 2017/0353319 | A1 | 12/2017 | Scarlata et al. |
| 2018/0114012 | A1 | 4/2018 | Sood et al. |
| 2018/0241560 | A1 * | 8/2018 | Chen ...................... G06F 21/57 |
| 2019/0114431 | A1 * | 4/2019 | Cheng .................... G06F 21/53 |

FOREIGN PATENT DOCUMENTS

| | | |
|---|---|---|
| WO | 2015/200581 A1 | 12/2015 |
| WO | 2016/105861 A1 | 6/2016 |

OTHER PUBLICATIONS

"Trusted Platform Module Library, Part 3: Commands", Family "2.0", Level 00 Revision 01.38, Sep. 29, 2016, TCG Published (411 pages).

Costan et al., "Intel SGX Explained", 2016 (118 pages).

Intel Corp., "Intel Software Guard Extensions Programming Reference", 329298-002US, Oct. 2014 (186 pages).

Paladi, et al., "Trusted Launch of Virtual Machine Instances in Public IaaS Environments" Oct. 2011 (15 pages).

* cited by examiner

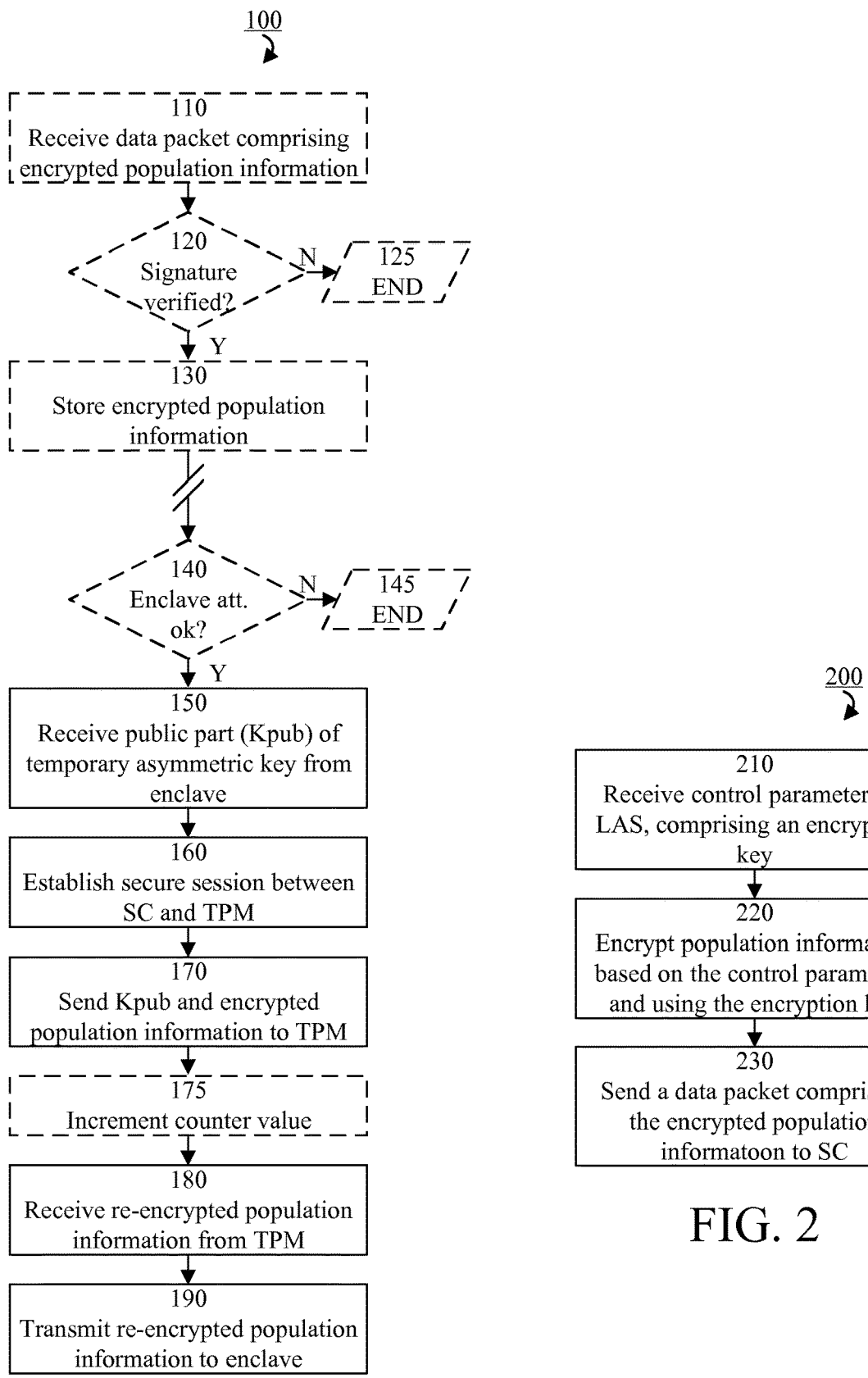

ENCLAVE POPULATION

CROSS REFERENCE TO RELATED APPLICATION(S)

This application is a 35 U.S.C. § 371 National Stage of International Patent Application No. PCT/EP2018/062640, filed May 16, 2018, designating the United States.

TECHNICAL FIELD

The present disclosure relates generally to the field of trusted computing. More particularly, it relates to secure enclave population.

BACKGROUND

Confidential (or trusted) computing ensures that when data is in clear (unencrypted), which is typically required for efficient processing, the data is protected inside a Trusted Execution Environment (TEE; also known as an enclave).

In trusted computing, enclave technology is under development. In this context, application of existing technologies may be considered for population, e.g. one or more of:
Intel Software Guard Extensions (SGX) Programming Reference (details available from https://software.intel.com/sites/default/files/managed/48/88/329298-002.pdf)
Secure Encrypted Virtualization Key Management (provided by AMD and details available from http://support.amd.com/)

Furthermore, using Trusted Platform Module (TPM, details available from https://trustedcomputinggroup.org/ and W. Arthur, D. Challenger, K. Goldman, "A practical guide to TPM 2.0", Apress, Berkeley, Calif.) to protect boot software and/or other software included in the Trusted Computing Base (TCB) is described in R. Yeluri, E. Castro-Leon, "Building the infrastructure for cloud security", Apress, and using a protected secure component (SC) to handle security related functionality is described in http://soda.swedish-ict.se/5611/1/DBSP.pdf.

A secure enclave (e.g. SGX implemented by Intel in their processors) offers the possibility to have services running in hardware owned by an operating customer (OC; a licensee) without the licensee being able to extract information from the enclave neither while it is running nor when it is not running and saved for later restart. Such technology can be used by an application vendor (AV) to keep proprietary information/software confidential. However, this approach requires population of the enclave with the confidential information (e.g. code, data, keys, etc.).

Thus, in trusted computing, it may be desirable to securely populate secret information into a secure enclave. Generally, the secret information may be any suitable information (e.g. population data, a decryption key for population data, etc.) and it is typically crucial that the operating customer should not be able to access the secret information.

Furthermore, it is typically desirable that it is possible for the operating customer to execute the population only once and only on one instance (e.g., a single copy of a running program). This may be referred to as one-time population; a population that cannot be repeated, neither on the same platform nor on another platform.

One practical way to enable population is to have confidential information encrypted in, or in association with, the enclave (e.g. in an enclave image). Then, only the decryption key (population key)—for decryption of the confidential information—needs to be provided during population after the enclave has been instantiated.

However, letting the OC handle the encrypted confidential information for injection of the enclave is typically not sufficiently secure, since in such a scenario the OC can populate an unlimited number of enclaves (on different hardware).

One solution to this problem is to apply online enclave population, where the AV encrypts the confidential information with the public key of the enclave instance after an online remote attestation of the enclave instance has been carried out.

However, there may be a problem to achieve securely population and/or to limit the number of populations when secret information is to be securely populated into a secure enclave if the source of the secret information (e.g. a server located at an enclave provider, referred to herein as an application vendor—AV) and the target of the secret information (i.e. the secure enclave which may, e.g., be comprised in a server located at an enclave user, referred to herein as an operating customer—OC) are not in contact with each other at the population instant (i.e., the point in time when the population is performed), e.g. if either, or both, of the source of the secret information and the secure enclave lacks Internet connection.

This problem may be particularly relevant since network functions are often delivered as (micro)services that are implemented by software that runs on generic hardware or a virtualized hardware platform, where such generic hardware or virtualized hardware platform is not necessary built and provided by the application vendor (AV). Contrarily, such generic hardware or virtualized hardware platform may comprise standard commercial off-the-shelf (COTS) platforms, e.g. Intel Central Processing Units (CPUs), Virtual Machine-ware (VMware), Kerned-based Virtual Machine (KVM), Quick Emulator (QEMU), etc.

Therefore, there is a need for alternative approaches to enclave population. Preferably, such approaches are suitable for situations when the AV and/or the OC are offline, or when there is no possibility to communicate between the AV and the OC for some other reason.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

According to a first aspect, this is achieved by a method of a secure component (SC) of a local attestation server (LAS) for populating an enclave associated with the LAS. The SC comprises stored encrypted population information previously received in a data packet and encrypted by an encryption key matching a private decryption key of a trusted platform module (TPM) associated with the LAS.

The method comprises (when a remote attestation of the enclave is successful) receiving a public part of a temporary asymmetric key from the enclave, establishing a secure session between the SC and the TPM, sending (to the TPM by using the secure session) the encrypted population information and the public part of the temporary asymmetric key, receiving (from the TPM by using the secure session) the population information decrypted by the private decryption key and re-encrypted by the public part of the temporary asymmetric key, and transmitting the re-encrypted population information to the enclave.

Generally, it should be noted that the secure component referred to herein is under the control of the OC and is not trusted by the AV. Thus, decrypted population information should only exist in the TPM and in the enclave.

In some embodiments, the method further comprises performing the remote attestation of the enclave by comparing metrics of the enclave to a list of acceptable enclave metric values comprised in the SC.

In some embodiments, the method further comprises receiving the data packet comprising the encrypted population information, performing verification of a signature of the data packet, and storing the encrypted population information only when the signature is verified.

In some embodiments, the encrypted population information comprises an encrypted population key for decryption of encrypted population data stored in the enclave.

In some embodiments, the encrypted population information is associated with a set of acceptable states of each of one or more platform configuration registers (PCRs), and the re-encrypted population information is received from the TPM only when an actual state of the one or more PCRs of the TPM matches one of the corresponding acceptable states. Generally, the set of acceptable states may comprise any applicable number of acceptable states (e.g., one, two, three, or more). Optionally, the method may further comprise sending the set, or part of the set, of acceptable states of each of the one or more PCRs to the TPM by using the secure session.

In some embodiments, the encrypted population information is associated with an acceptable counter value, and the re-encrypted population information is received from the TPM only when an actual counter value of the TPM matches the acceptable counter value. Generally, there may be one or more acceptable counter values (e.g., one, two, three, or more).

Optionally, the method may further comprise sending the acceptable counter value to the TPM by using the secure session.

In some embodiments, the method further comprises causing the actual counter value of the TPM to be incremented in association with sending the encrypted population information and the public part of the temporary asymmetric key.

In some embodiments, the method further comprises, in association with sending the encrypted population information and the public part of the temporary asymmetric key causing an insecure actual counter value of the LAS to be incremented, and accordingly updating a corresponding register of the TPM only when the actual state of the one or more PCRs of the TPM matches one of the corresponding acceptable states.

In some embodiments, the acceptable counter value and the actual counter value are TPM boot counter values.

In some embodiments, the encrypted population information is decryptable only once by the private decryption key of the TPM.

A second aspect is a method for enabling population of an enclave associated with a local attestation server (LAS) comprising a secure component (SC). The method comprises receiving control parameters of the LAS, comprising an encryption key matching a private decryption key of a trusted platform module (TPM) associated with the LAS, encrypting population information based on the control parameters and using the encryption key, and sending a data packet comprising the encrypted population information to the SC.

In some embodiments, the method further comprises signing the data packet for verification by the SC.

In some embodiments, the encrypted population information comprises an encrypted population key for decryption of encrypted population data stored in the enclave.

In some embodiments, the control parameters further comprises a counter value of the TPM and/or a state of each of one or more platform configuration registers (PCRs) of the TPM.

In some embodiments, the encrypted population information is decryptable only once by the private decryption key of the TPM.

A third aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fourth aspect is an apparatus comprising a secure component (SC) for a local attestation server (LAS), the apparatus being for population of an enclave associated with the LAS. The SC is configured to comprise stored encrypted population information received in a data packet and encrypted by an encryption key matching a private decryption key of a trusted platform module (TPM) associated with the LAS.

The SC is configured to (when a remote attestation of the enclave is successful) receive a public part of a temporary asymmetric key from the enclave, establish a secure session between the SC and the TPM, send (to the TPM by using the secure session) the encrypted population information and the public part of the temporary asymmetric key, receive (from the TPM by using the secure session) the population information decrypted by the private decryption key and re-encrypted by the public part of the temporary asymmetric key, and transmit the re-encrypted population information to the enclave.

In some embodiments, the apparatus further comprises one or more of the LAS, the TPM, and the enclave.

A fifth aspect is an apparatus for enabling population of an enclave associated with a local attestation server (LAS) comprising a secure component (SC). The apparatus comprises controlling circuitry configured to cause reception of control parameters of the LAS, comprising an encryption key matching a private decryption key of a trusted platform module (TPM) associated with the LAS, encryption of population information based on the control parameters and using the encryption key, and sending of a data packet comprising the encrypted population information to the SC.

In some embodiments, any of the above aspects may additionally have features identical with or corresponding to any of the various features as explained above for any of the other aspects.

An advantage of some embodiments is that alternative approaches to enclave population are provided.

Another advantage of some embodiments is that enclave population is enabled when the AV and/or the OC are offline, or when there is no possibility to communicate between the AV and the OC for some other reason.

Yet an advantage of some embodiments is that the security of enclave population in off-line scenarios is improved.

Yet another advantage of some embodiments is that controlled population (e.g. including a limitation to one-time population) of secret information (only to be known by the enclave provider, AV) into an enclave instance can be performed without online connection between the enclave provider (AV) and the customer (OC).

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 1 is a flowchart illustrating example method steps according to some embodiments;

FIG. 2 is a flowchart illustrating example method steps according to some embodiments;

DETAILED DESCRIPTION

Figure 3:
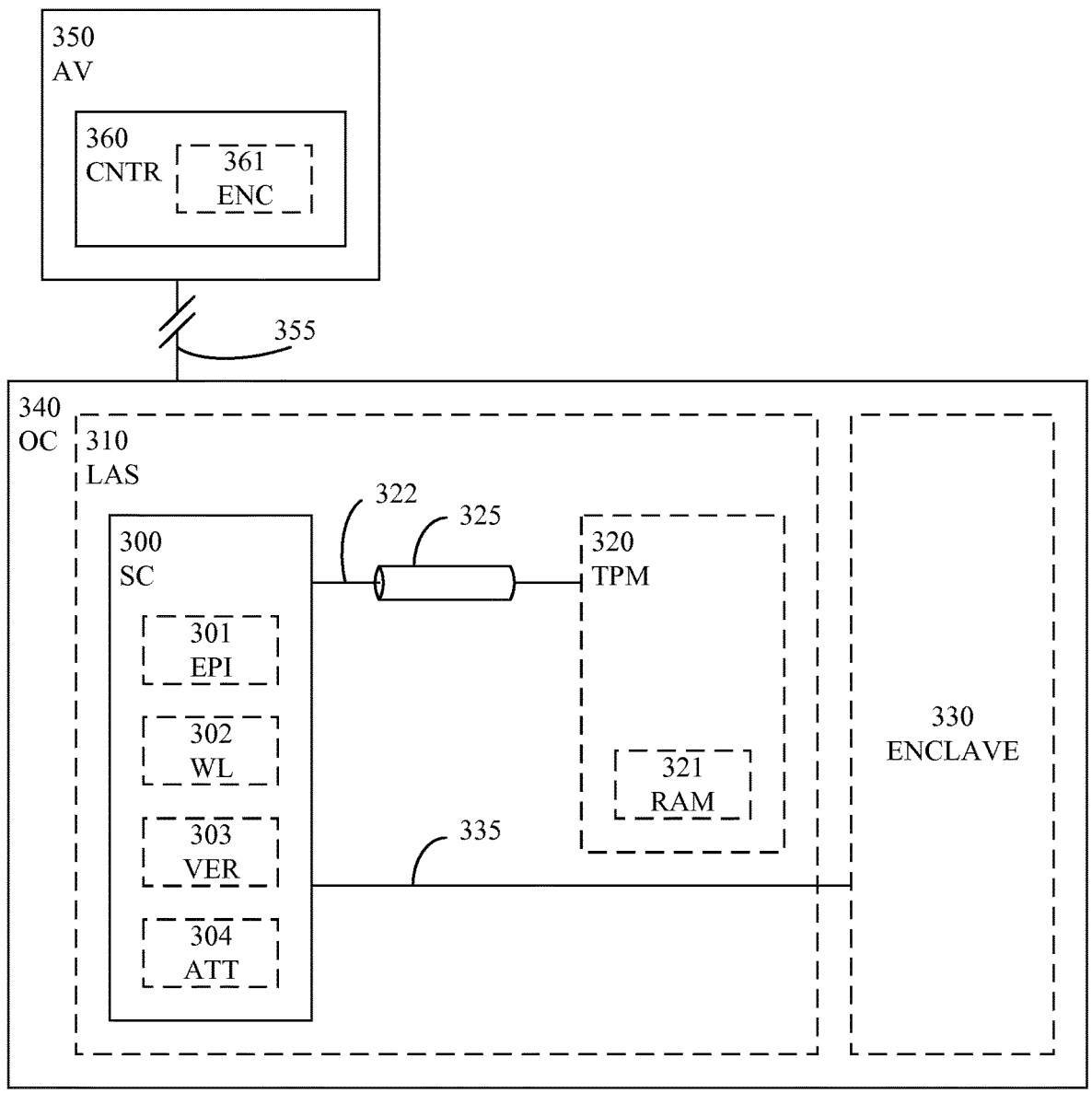
FIG. 3 is a schematic block diagram illustrating example apparatuses according to some embodiments.

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where secure enclave population is enabled. Some embodiments are particularly useful when the source of the secret information (e.g. an application vendor—AV) and the enclave (e.g., located at an operating customer—OC) are not in contact with each other at the population instant.

FIG. 1 illustrates an example method 100 according to some embodiments. The method 100 may be performed by a secure component (SC) of a local attestation server (LAS), which is typically under control of the operating customer (OC) and is associated with the enclave.

The method may start in optional step 110 where a data packet comprising encrypted population information is received. The data packet may, for example, be any suitable collection of data which can only be interpreted at the OC by the enclave. One term commonly used for an example of the data packet is a "blob".

The reception may be over any suitable communication channel between the AV and the OC. For example, the reception may be over an online connection over the Internet, which is later disrupted so that it cannot be used at the population instant. Alternatively or additionally, the data packet may be received in association with delivery of the enclave from the AV to the OC. Yet alternatively or additionally, reception may be via one or more of: e-mail, removable storage media (e.g., Universal Serial Bus—USB—pen drive, Secure Digital—SD—card, or similar), optical storage media (e.g., Compact Disc—CD, Digital Versatile Disc—DVD, or similar), and Quick Response—QR—code.

As mentioned above, the population information may, for example, be a decryption key (population key) for decryption of population data already available in encrypted form in the enclave.

Furthermore, the data packet may, in some embodiments, comprise a list of acceptable enclave metrics (an enclave white list) to be used by the SC for enclave attestation. Alternatively, such a list may be otherwise available to the SC.

Additionally or alternatively, the data packet may, according to some embodiments, also comprise one or more of a set of acceptable states of each of one or more platform configuration registers (PCRs) and an acceptable counter value, each associated with a trusted platform module (TPM) which is comprised in—or otherwise associated with—the LAS.

The population information comprised in the data packet is encrypted by an encryption key matching a private decryption key of the TPM. Furthermore, there may be associations between the encrypted population information and one or more of the acceptable states of the PCRs and the acceptable counter value (regardless of whether they are comprised in the data packet or not). In some embodiments, the acceptable states of the PCRs and/or the acceptable counter value are not comprised in the data packet, but the encryption itself depends on the acceptable states of the PCRs and/or the acceptable counter value.

The SC performs a verification of a signature of the data packet in optional step 120. When the verification is un-successful (N-path out from step 120) the SC discards the data packet and the process is terminated as illustrated in optional step 125. When the verification is successful (Y-path out from step 120) the SC stores the encrypted population information of the data packet as illustrated by optional step 130.

Steps 110, 120, 125, 130 may be performed at an earlier point in time than the rest of the process, e.g. when the AV and the OC have a communication channel between them (e.g. an online connection) or when the enclave is delivered to the OC.

When the population is to be performed, the SC typically performs a remote attestation of the enclave as illustrated in optional step 140. The remote attestation may be performed using any suitable attestation approach. For example, the remote attestation may comprise determining whether metrics of the enclave matches any of the entries of the list of acceptable enclave metrics.

When the remote attestation is un-successful (N-path out from step 140) the process is terminated as illustrated in optional step 145. When the remote attestation is successful (Y-path out from step 140) the process continues to step 150.

In step 150, the SC receives a public part (Kpub) of a temporary asymmetric key from the enclave and, in step 160, a secure session is established between the SC and the TPM. In some embodiments, steps 150 and 160 may be performed in the reversed order or in parallel.

In step 170, the SC sends the encrypted population information (comprised in the previously received data packet and stored in the SC) and the public part (Kpub) of the temporary asymmetric key to the TPM using the secure session.

Step 170 may, optionally, also comprise sending the acceptable states of the PCRs and/or the acceptable counter value to the TPM. This information (the acceptable states of the PCRs and/or the acceptable counter value) pertains the condition (policy) under which a TPM operation like decryption will properly work and give the intended result. When, for example, the encrypted data object has a hash of the evaluation of the condition built into the object, the condition itself can already be known by the TPM and need not to be sent (or may be seen as implicitly sent by means of the hash). A local evaluation is performed internally in the TPM and compared with the hash of the condition in the object.

In typical embodiments, the actual counter value is caused to be incremented in association with sending the encrypted population information and the public part of the temporary asymmetric key as illustrated by optional step 175. The increment should typically take place after the TPM has checked whether the acceptable counter value matches the actual counter value.

Provided the acceptable states of the PCRs and/or the acceptable counter value matches the actual states of the PCRs and/or the actual counter value, the TPM decrypts the population information using the private decryption key of the TPM, re-encrypts the decrypted population information using the public part (Kpub) of the temporary asymmetric key received by the SC from the enclave, and sends the re-encrypted population information to the SC which receives it in step 180 and transmits it to the enclave in step 190.

Thus, the TPM tests whether the acceptable states of the PCRs match the actual states of the PCRs and/or whether the acceptable counter value matches the actual counter value.

Application of the PCR states (matching acceptable state(s) to actual state(s)) aims at preventing that the population data can be re-used before rebooting (e.g., at population, a specific PCR state is checked and stepped so that a second population will fail) and/or preventing the population data can be used for another platform than intended. Furthermore, application of the PCR states may be used together with a boot-counter associated with the "blob" to prevent re-population (at reboot, all PCRs are reset and the boot counter is incremented).

PCRs are used to control the hardware and software running on the LAS. PCRs are registers in the TPM which can be extended with a hash value during boot and/or later on. Using technologies such as, for example, Intel's trusted execution technology (TXT) or similar, some PCRs will be extended with footprints of boot software and hardware during booting. Thereby it is possible to know what is booted on the machine by checking the values of these PCRs. Such measurements can include everything up to kernel. It is also possible to measure additional software on top of kernel. In some embodiments, these principles are applied for measuring the SC if it is not part of the kernel. All PCRs are always reset at every reboot.

According to some embodiments, AV encrypts the population information such that it should (or can) only be decrypted by a TPM on a platform with acceptable PCR states. For example, the decryption of the population information may be limited by binding the decryption to a specific set of PCR states. In a more flexible example, the decryption of the population information is limited to any PCR states which are signed by a signer owned by the AV. In the latter case, multiple PCR states can be acceptable and new acceptable states can be added without any need to recreate the encrypted population information.

Using the application of acceptable PCR states in the context of some embodiments has the advantage that the AV has control over which environment(s) to be entrusted for re-encryption of the population data.

Application of the counter values (matching an acceptable counter value to an actual counter value, and incrementing the actual counter value) aims at preventing that the population data can be used more than once, i.e., that only one population is performed.

In a first example of application of counter values the actual counter value is stored as a non-decreasable value in the TPM non-volatile random access memory (NVRAM) 321 by using a nonvolatile (NV) counter which is stepped (i.e. increased by one; a form of increment) during the enclave population.

In a second example of application of counter values the actual counter value is stored in an ordinary NVRAM register in the TPM. Then, incrementing may comprise any value updating, e.g. increasing by one or any other suitable number, or decreasing by one or any other suitable number.

An advantage with the second example is that it can be used when several different enclave populations are performed by the same LAS. This situation may be applicable, for example, when the same LAS is involved in the population of more than one system. Alternatively or additionally, this situation may be applicable, for example, when several enclaves should be populated independently.

In such situations, a table with the actual counter value for each enclave may be stored in unprotected memory on the platform and a hash of this table may be stored in a register belonging to the ordinary NVRAM 321. When an actual counter value is incremented in the table, a write to the NVRAM register is also done to update the hash. When the actual counter value is read from the table, the hash is verified. Typically, the NVRAM register in these examples are write protected by a signer owned by the AV to ensure that write to the NVRAM register is only allowed when actual PCRs states matches the acceptable PCR states.

Thus, in some embodiments, causing the actual counter value to be incremented may comprise causing an insecure actual counter value of the LAS (exemplified by the table above) to be incremented, and accordingly updating a corresponding register of the TPM only when the actual state of the one or more PCRs of the TPM matches one of the corresponding acceptable states.

In a third example of application of counter values the actual counter value is a TPM boot counter value. Then, the acceptable counter value is a specific value (or a range of values) of the TPM boot counter, which increases at each reboot. The AV uses the acceptable value of the boot counter when creating the data packet so that the encrypted population information is bound to that value. The state of the TPM boot counter (reset count and/or restart count) can be used together with a PCR to prevent re-use of the population information during the same boot cycle.

For example, if only one population is to be allowed, then only a single boot counter value should be acceptable. Furthermore, an additional check may be performed to ensure that a further population is not performed in the same boot cycle. This may be enabled via a PCR check similarly to what has been described above, and by letting a specific PCR be extended directly before the population information is re-encrypted.

FIG. 2 illustrates an example method 200 for enabling population of an enclave associated with a LAS controlled by an operating customer (OC). The method 200 may be performed by a device controlled by an application vendor (AV) providing the enclave.

In step 210, control parameters of the LAS are received. The control parameters comprise an encryption key matching a private decryption key of a TPM associated with the LAS. The control parameters may be received by any suitable means. For example, they may be received via a communication channel between the OC and the AV or via a user input interface.

The population information is encrypted in step 220 based on the control parameters and using the encryption key as elaborated on above and, in step 230, a data packet comprising the encrypted population information is sent to the SC. In some embodiments, the data packet is signed for verification by the SC before it is sent.

The control parameters may further comprise a counter value (the acceptable counter value, or a set of acceptable counter values) of the TPM and/or a state (an acceptable state, or a set of acceptable states) of each of one or more PCRs of the TPM. As also elaborated on above, the encryption may be based on the counter value and/or the PCR states. Alternatively or additionally, the counter value and/or the PCR states may be comprised in the data packet.

Generally, it may be preferable in some embodiments that the encrypted population information is decryptable only once by the private decryption key of the TPM. This may be achieved, for example, as described above using counter values and/or PCR states.

FIG. 3 schematically illustrates example apparatuses 350, 340 for an application vendor (AV) and an operating customer (OC) according to some embodiments. The example apparatuses are for population of an enclave 330.

The example apparatus 340 controlled by the OC comprises a secure component (SC) 300, which may be configured to perform any of the method steps of the example method 100 of FIG. 1. The SC is for (e.g. comprised in) a local attestation server (LAS) 310, which comprises (or is otherwise associated with) a trusted platform module (TPM) 320. The LAS also comprises (or is otherwise associated with) the enclave 330 to be populated. In various embodiments, the SC, TPM and enclave may all be comprised in the same server or one or more of the SC, TPM and enclave may be comprised in a separate server.

The SC 300 has a connection 335 to the enclave for sending and receiving signals to and from the enclave. The SC 300 also has a connection 322 to the TPM for sending and receiving signals to and from the TPM. The connection 322 is configured for establishment of a secure session 325 between the SC and the TPM.

The SC 300 is configured to comprise stored encrypted population information (EPI) 301 received in a data packet and encrypted by an encryption key matching a private decryption key of the TPM 320. As explained above in connection to FIG. 1, the SC 300 may be configured to receive the data packet comprising the encrypted population information, perform verification of a signature of the data packet, and store the encrypted population information only when the signature is verified. To this end the SC may comprise verifying circuitry (VER) 303 configured to perform the verification.

Typically, the data packet may be received over a communication channel 355 between the AV and the OC, which is no longer available when the population is to be performed. As exemplified above, the communication channel 355 may be any suitable one-way, two-way or multi-user channel. For example, the reception may be over an online connection over the Internet, which is later disrupted so that it cannot be used at the population instant.

Alternatively or additionally, the data packet may be received in association with delivery of the enclave from the AV to the OC. Yet alternatively or additionally, reception may be via one or more of: e-mail, removable storage media (e.g., Universal Serial Bus—USB—pen drive, Secure Digital—SD—card, or similar), optical storage media (e.g., Compact Disc—CD, Digital Versatile Disc—DVD, or similar), and Quick Response—QR—code. As also explained above in connection to FIG. 1, the SC may be further configured to perform remote attestation of the enclave 330 by comparing metrics of the enclave to a list (WL) 302 of acceptable enclave metric values comprised in the SC. To this end the SC may comprise attestation circuitry (ATT) 304 configured to perform the remote attestation.

The SC is configured to, when the remote attestation of the enclave is successful, receive a public part of a temporary asymmetric key from the enclave over the connection 335 and establish a secure session 325 between the SC and the TPM.

The SC is configured to use the secure session 325 to send the encrypted population information (EPI) 301 and the public part of the temporary asymmetric key to the TPM and receive the re-encrypted population information from the TPM as explained above in connection to FIG. 1.

The SC is also configured to transmit the re-encrypted population information to the enclave over the connection 335.

The example apparatus 350 controlled by the AV comprises controlling circuitry (CNTR; e.g., a controller) 360 configured to cause execution of any of the method steps of the example method 200 of FIG. 2; reception of control parameters of the LAS comprising an encryption key matching a private decryption key of the TPM, encryption of population information based on the control parameters and using the encryption key, and sending (over the communication channel 355) of a data packet comprising the encrypted population information to the SC. To this end the controlling circuitry may comprise or be otherwise associated with encryption circuitry (ENC) 361 configured to perform the encryption as elaborated on above.

Thus, according to some embodiments, offline enclave population is enabled. By combining enclave technologies, TPM technologies and secure boot technologies it is enabled to populate an enclave with a secret (population information) without an online connection between the enclave and the enclave provider (AV). Furthermore, the population can be limited to only one execution.

In a typical example, the enclave provider (AV) creates a blob (initialization blob; data packet) comprising an encrypted secret S (population information), denoted S-blob, which can only be decrypted and used once. This may be achieved using a LAS that includes a TPM and a SC. The enclave provider delegates the attestation of the enclave instance to be populated to the SC, and trusts the TPM to handle the population information, as described above. Thus, the enclave provider binds the S-blob such that it can only be uncovered by the specified platform including specified lower level software and a specified version value (counter value) that will be updated after the population. The SC will let the TPM decrypt the population information in the S-blob only to re-encrypt it to an ephemeral key of the enclave (using the public part of the temporary asymmetric key).

To accomplish the above, TPM-based boot control technology may be used to achieve TPM-measurements up to, and including, kernel on the LAS. All firmware and software up to, and including, the kernel is measured and the measurements are stored in TPM PCRs using the TPM-based boot control technology. Thereby, a controlled observation (measurement) of the hardware, firmware, and software up to kernel is provided, which can be considered as trusted by someone who measures the PCR states and compares them to known, trustworthy, values (acceptable states).

Typically, the machine instructions available are divided under two protections rings; ring 0 instructions used by privileged software such as operating system (OS) and virtual machine monitor (VMM) and ring 3 instructions used by the user space software and enclaves to execute functionality enclaves.

The SC may be a software component which is the only access point to the TPM. This may be achieved by letting the SC be a part of the kernel and limit TPM access to ring 0, i.e., to kernel mode.

The above approach may be particularly applicable when a dedicated LAS is used. With a use-specific and minimal kernel, this approach will keep the trusted computing base (TCB) small which provides for a small attack surface.

Another way to achieve limited TPM access when SC is outside of the kernel is to restrict the TPM access by using a suitable mandatory access control (MAC) solution (e.g., Security-Enhanced Linux, SELinux). The MAC policy and/or the SC can, for example, be controlled by using an integrity measurement tool (e.g., integrity measurement architecture, IMA). Uncontrolled updates of the SC may also be prevented by using a MAC regime or by creating extension to IMA.

Typically, the S-blob is signed by the AV so that the OC can know its origin and the S-blob is bound to the specific platform and to a signature made by the AV that is used by the AV to sign acceptable platform setups characterized by a set of PCR-values.

Application of some embodiments prevents that the OC reuses the S-blob after the first population on the same or different hardware, thereby preventing the OC from making uncontrolled S-populated copies of the enclave instance.

One advantage of the solution is that a controlled population of a secret, S (only to be known by the enclave provider, AV), to an enclave instance can be performed without online connection between the enclave provider and the customer. Controlled population may typically refer to one-time population that cannot be repeated, neither on the same platform nor on another one.

In some embodiments one or more of the following phases may be comprised in an approach for enabling secure enclave population:
1. The AV knows/obtains a relevant TPM key (e.g., an encryption key matching a private decryption key of the TPM). This information can, for example, be provided to the AV at a stage which is previous to the population (e.g., in association with order/purchase or delivery of the enclave). When the boot counter in the TPM is used as the actual counter, information regarding the value, or range, of the boot counter at the population instant should also be provided to the AV.
2. The AV sends a package (data packet) to the OC comprising everything needed for the population. This may typically be:
   a. The secret to be populated (population information), denoted S, bound to the TPM key and a signer owned by the AV. The signer signs only PCRs reflecting states corresponding to controlled versions of the TCB (including the SC). The states should typically provide for restriction of TPM access only from the SC and for integrity-protection of the SC. S should typically also be bound to the operation to be performed with it; duplicating it to be able to encrypt it with the public key of the enclave. When the boot counter or an NVRAM register is used as the actual counter value, S should typically also be bound to the counter value.
   b. An acceptable counter value, if not included in the policy of the secret to be populated described above.
   The whole package is signed by a key whose public value (or hash thereof) is hardcoded in the SC and whose private value is only known by the AV.
3. SC checks the signature of the S-blob and proceeds only when it is verified.
4. SC may comprise a "white list" with accepted measurements (values, metrics) of the enclave instance to be populated (and possibly its corresponding SGX environment). SC performs a remote attestation on the enclave and, if the result does not match an entry in the white list, the population is stopped. If the remote attestation is successfully completed, an integrity protected channel may be setup between the SC and the enclave and a secure session is setup between the SC and the TPM.
5. The enclave creates a (temporary) asymmetric key (K), and its public part (Kpub) is shared with the SC.
6. The version counter (e.g., in TPM NVRAM) may be increased.
7. The SC duplicates the S-blob in the TPM to be decrypted, and re-encrypted with Kpub. This operation may, as described above, be restricted to only be performed if the key of the TPM (and possibly the counter value and/or the PCR states) are matching expected values.
8. SC sends S, re-encrypted with Kpub, to the enclave.
9. The enclave decrypts S and destroys K, which will never be used again. One way to avoid that K is maliciously reused to populate an additional instance of the enclave with S, is to only let K exist ephemerally in the enclave and ensure that the private part of K (Kpriv) never exists outside of the enclave (not even encrypted in a blob sealed by the enclave).

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a local attestation server or any other suitable computing device (such as a wireless communication device or a network node).

Embodiments may appear within an electronic apparatus (such as a computing device) comprising arrangements, circuitry, and/or logic according to any of the embodiments described herein. Alternatively or additionally, an electronic apparatus (such as a computing device) may be configured to perform methods according to any of the embodiments described herein.

Figure 4:
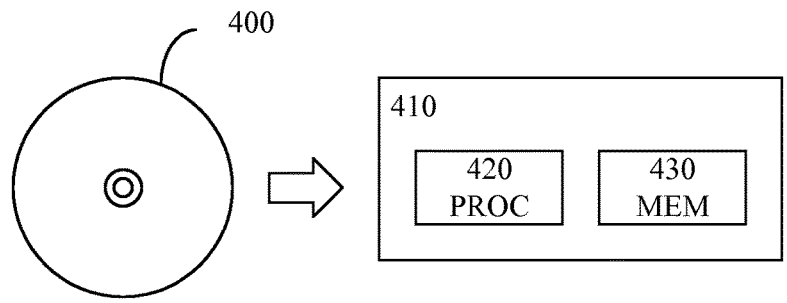
FIG. 4 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 4 illustrates an example computer readable medium in the form of a compact disc (CD) ROM 400. The computer readable medium has stored thereon a computer program comprising program instructions. The computer program is loadable into a data processor (PROC) 420, which may, for example, be comprised in a computing device 410. When loaded into the data processing unit, the computer program may be stored in a memory (MEM) 430 associated with or comprised in the data-processing unit. According to some embodiments, the computer program may, when loaded into and run by the data processing unit, cause execution of method steps according to, for example, any of the methods illustrated in FIGS. 1-2 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method of a secure component (SC) of a local attestation server (LAS) for populating an enclave associated with the LAS, wherein the SC comprises stored encrypted population information previously received in a data packet and encrypted by an encryption key matching a private decryption key of a trusted platform module (TPM) associated with the LAS, the method comprising:
   receiving a public part of a temporary asymmetric key from the enclave;
   establishing a secure session between the SC and the TPM;
   sending, to the TPM by using the secure session, the encrypted population information and the public part of the temporary asymmetric key;
   receiving, from the TPM by using the secure session, the population information decrypted by the private decryption key and re-encrypted by the public part of the temporary asymmetric key; and
   transmitting the re-encrypted population information to the enclave.

2. The method of claim 1, further comprising performing a remote attestation of the enclave by comparing metrics of the enclave to a list of acceptable enclave metric values comprised in the SC.

3. The method of claim 1, further comprising:
   receiving the data packet comprising the encrypted population information;
   performing verification of a signature of the data packet; and
   storing the encrypted population information only when the signature is verified.

4. The method of claim 1, wherein the encrypted population information comprises an encrypted population key for decryption of encrypted population data stored in the enclave.

5. The method of claim 1, wherein the encrypted population information is associated with a set of acceptable states of each of one or more platform configuration registers (PCRs), and wherein the re-encrypted population information is received from the TPM only when an actual state of the one or more PCRs of the TPM matches one of the corresponding acceptable states.

6. The method of claim 5, wherein the encrypted population information is associated with an acceptable counter value, wherein the re- encrypted population information is received from the TPM only when an actual counter value of the TPM matches the acceptable counter value.

7. The method of claim 6, wherein the method further comprises causing the actual counter value of the TPM to be incremented in association with sending the encrypted population information and the public part of the temporary asymmetric key.

8. The method of claim 6, wherein the method further comprises, in association with sending the encrypted population information and the public part of the temporary asymmetric key:
   causing an insecure actual counter value of the LAS to be incremented; and
   accordingly updating a corresponding register of the TPM only when the actual state of the one or more PCRs of the TPM matches one of the corresponding acceptable states.

9. The method of claim 6, wherein the acceptable counter value and the actual counter value are TPM boot counter values.

10. The method of claim 1, wherein the encrypted population information is decryptable only once by the private decryption key of the TPM.

11. A computer program product comprising a non-transitory computer readable medium, having thereon a computer program comprising program instructions, the computer program being loadable into a data processing unit and configured to cause execution of the method of claim 1 when the computer program is run by the data processing unit.

12. A method for enabling population of an enclave associated with a local attestation server (LAS) comprising a secure component (SC), the method comprising:
    receiving control parameters of the LAS, comprising an encryption key matching a private decryption key of a trusted platform module (TPM) associated with the LAS;
    encrypting population information based on the control parameters and using the encryption key; and
    sending a data packet comprising the encrypted population information to the SC.

13. The method of claim 12, further comprising signing the data packet for verification by the SC.

14. The method of claim 12, wherein
    the encrypted population information comprises an encrypted population key for decryption of encrypted population data stored in the enclave, and/or
    the control parameters further comprises a counter value of the TPM and/or a state of each of one or more platform configuration registers (PCRs) of the TPM.

15. An apparatus comprising a hardware secure component (SC) for a local attestation server (LAS), the apparatus being for population of an enclave associated with the LAS, wherein the SC is configured to comprise stored encrypted population information received in a data packet and encrypted by an encryption key matching a private decryption key of a trusted platform module (TPM) associated with the LAS, the SC being configured to, when a remote attestation of the enclave is successful:
    receive a public part of a temporary asymmetric key from the enclave;
    establish a secure session between the hardware SC and the TPM;
    send, to the TPM by using the secure session, the encrypted population information and the public part of the temporary asymmetric key;
    receive, from the TPM by using the secure session, the population information decrypted by the private decryption key and re-encrypted by the public part of the temporary asymmetric key; and
    transmit the re-encrypted population information to the enclave.

16. The apparatus of claim 15, wherein the hardware SC is further configured to perform the remote attestation of the enclave by comparing metrics of the enclave to a list of acceptable enclave metric values comprised in the hardware SC.

17. The apparatus of claim 15, wherein the hardware SC is further configured to:
    receive the data packet comprising the encrypted population information;
    perform verification of a signature of the data packet; and
    store the encrypted population information only when the signature is verified.

18. The apparatus of claim 15, wherein the encrypted population information comprises an encrypted population key for decryption of encrypted population data stored in the enclave.

19. The apparatus of claim 15, further comprising one or more of the LAS, the TPM, and the enclave.

20. An apparatus for enabling population of an enclave associated with a local attestation server (LAS) comprising a secure component (SC) the apparatus comprising controlling circuitry configured to cause:
    reception of control parameters of the LAS, comprising an encryption key matching a private decryption key of a trusted platform module (TPM) associated with the LAS;
    encryption of population information based on the control parameters and using the encryption key; and
    sending of a data packet comprising the encrypted population information to the SC.

* * * * *